Figure 1:
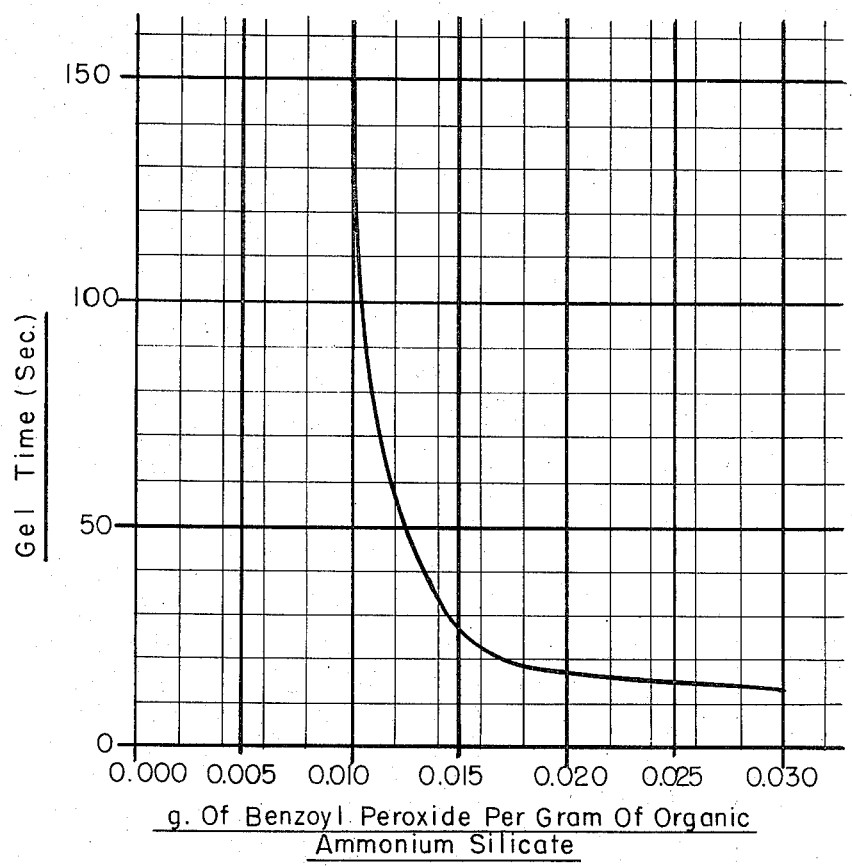

United States Patent [19]
Weldes et al.

[11] 3,819,392
[45] June 25, 1974

[54] NON-AQUEOUS QUATERNARY AMMONIUM SILICATE SOLUTIONS

[75] Inventors: Helmut H. Weldes, Havertown; John S. Stephen Bobb, Springfield, both of Pa.; M. Robert Derolf, Blackwood, N.J.

[73] Assignee: Philadelphia Quartz Company, Valley Forge, Pa.

[22] Filed: Apr. 24, 1972

[21] Appl. No.: 246,863

Related U.S. Application Data

[63] Continuation of Ser. No. 853,245, Aug. 27, 1967, abandoned.

[52] U.S. Cl. ............... 106/287 SE, 106/1, 106/14, 106/38.35
[51] Int. Cl. ........................................... B28b 7/34
[58] Field of Search ............ 106/14, 287 SE, 38.35

[56] References Cited
UNITED STATES PATENTS

| | | | |
|---|---|---|---|
| 3,239,521 | 3/1966 | Weldes | 260/247.7 |
| 3,248,237 | 4/1966 | Weldes et al. | 106/38.35 |
| 3,301,853 | 1/1967 | Weldes | 260/247.7 |
| 3,345,194 | 10/1967 | Weldes et al. | 106/287 |

FOREIGN PATENTS OR APPLICATIONS

| 792,853 | 4/1958 | Great Britain | 106/287 |
|---|---|---|---|

*Primary Examiner*—Lorenzo B. Hayes
*Attorney, Agent, or Firm*—Fred C. Philpitt; Ernest G. Posner

[57] ABSTRACT

Substantially non-aqueous solutions of a group of alkylalkanol quaternary ammonium silicates are prepared from the corresponding aqueous systems by substituting a miscible organic solvent. The miscibility may be varied by changing the alkylamine precursor of the quaternary ammonium silicate. Stable alkaline and acidic systems are formed which will set upon neutralization.

11 Claims, 2 Drawing Figures

3,819,392

NON-AQUEOUS QUATERNARY AMMONIUM SILICATE SOLUTIONS

This is a continuation of application Ser. No. 853,245, filed Aug. 27, 1967 and now abandoned.

INTRODUCTION

It is known that alkali metal free quaternary ammonium silicate solutions are much more miscible with common organic solvents than are alkali metal silicates or the double salts of alkali metal quaternary ammonium silicates. This is set out in U.S. Pat. No. 3,239,521 which is hereby incorporated by reference. It states that aqueous solutions containing 15% of silica will accept 30 to 80% of solvent such as methanol, ethanol, isopropanol, acetone, dioxane or tetrahydrofuran, and aqueous solutions containing 50% of silica will accept from 20 to 40%.

We have now found that certain specific types of quaternary ammonium silicate solutions described in the above patent are much more completely miscible with organic solvents than others and, specifically, than the tetraethanolammonium silicate used as an example in U.S. Pat. No. 3,239,521. The compatibility of the quaternary ammonium silicate with organic solvents can be varied by changing the alkyl nitrogen base precursor used in its preparation. By proper choice of this precursor, i.e. the alkylamine or quaternary ammonium hydroxide depending on the method used in the preparation, organic solutions of alkylalkanol quaternary ammonium silicate can be prepared directly from the aqueous systems. These solutions we term organic alkylalkanol quaternary ammonium silicates. We have also found that these organic solutions comprising 10% or less of water have unexpected useful properties not found in the more aqueous systems previously reported. Stable acidic organic alkylalkanol quaternary ammonium silicates can be formed by acidification to a pH of about 2. The organic alkylalkanol quaternary ammonium silicates can also be modified to obtain a stable system, such as for instance an alcoholic alkyl triethanol ammonium silicate and an organic compound that is oxidizable to form an acid. Such systems are useful for a number of refractory bonding applications, as binders for zinc-rich and other coatings and paints, for fiber treatment, as well as for imparting non-skid properties to fibers and surfaces, and for numerous other applications.

One of our objectives is the production of quaternary organic ammonium silicates that are miscible with organic solvents to form stable, substantially nonaqueous systems. A further objective of our invention is the production of novel stable systems consisting of organic quaternary ammonium silicate and acid, or an organic compound which can then be oxidized to an acid. Another objective is to use these materials as binder systems for refractory materials, coatings, for fiber treatment and other applications especially those which require a rapidly setting binder with a volatile solvent. The foregoing objectives, as well as others, will become apparent in studying the hereinafter presented disclosures and examples.

Aqueous sodium-free quaternary ammonium silicate solutions are prepared by charging a reaction vessel with a solution of colloidal silica and adding an amine to the sol under agitation preferably below 35°C. and alkylene oxide is delivered gradually into the system while maintaining the temperature.

The reaction of ammonia or an amine with ethylene oxide for instance is actually a series of competing reactions in which ethylene oxide is added sequentially to the amine until, at the last step, the amine, water and ethylene oxide combine to produce the quaternary ammonium hydroxide, $[R_xN(C_2H_5OH)_{4-x}]^+OH^-$.

It is also possible to prepare aqueous quaternary ammonium silicates by mixing the appropriate quaternary ammonium hydroxide with a suitable silica sol. During this operation heat is evolved and the temperature should be kept below about 40°C.

After completion of the reaction, the reaction mixture is usually allowed to age and is then concentrated by evaporation under vacuum; the temperature is kept below about 50°C. and preferably below 40°C. during the concentration.

It is furthermore well known to form silica alcosols from aqueous silica sols or silicon alcoholates, such as ethylorthosilicate. Such silicon alcoholates and their application are described in U.S. Pat. Nos. 2,795,022 and 3,313,737, among others. The problems of stability of silica alcosols and of forming bonds of adequate and rapid green strength are well known and have been the subject of much investigation. We have also found that an unmodified aqueous commercial silica sol will not be completely miscible with ethanol when the water level is reduced so that it would be 10% at a silica concentration of above about 15% or 20%.

THE INVENTION

Although it has been previously found that the quaternary ammonium silicates are more miscible with alcohol than alkali metal silicates, we have found a series of aqueous alkylalkanol quaternary ammonium silicate solutions which are more miscible with organic solvents than others and a group of these silicates which are completely soluble in low molecular weight organic solvents especially alcohols whereby nonaqueous systems of these quaternary silicates can be produced in substantially water free state. Our invention is further concerned with the use of these organic solutions in preparing other stable and useful systems.

Surprisingly, the properties of aqueous quaternary ammonium silicates and systems subsequently prepared from the aqueous silicates, are highly dependent upon the alkyl amine from which the ammonium ion was formed. We have found that the aqueous quaternary ammonium silicates most miscible with organic solvents are the alkylalkanol compositions in which the alkyl group may contain from one to four carbon atoms, although a polyethoxy group was also found to impart complete miscibility with alcohols to the aqueous silicate. We have further discovered that if the alkyl group consists of one or two carbon atoms the silicate has good miscibility and if the alkyl group consists of a normal chain of three or four carbon atoms the silicate is very miscible with common water miscible organic solvents and completely miscible with low molecular weight alcohols. The alkyl group can be unsaturated with no detrimental effect on the miscibility but if an alkyl chain of three or four atoms is branched the miscibility is reduced although it is still quite high. Therefore we prefer the n-propyl, n-butyl and allyl groups. Any combination of mixed alkyl and mono, di, or trialkanol compounds fall within the scope of our invention. For instance we have prepared the dimethyl and diethyl diethanol quaternary ammonium silicates as well as the trimethyl and triethyl ethanol ammonium silicates and these have outstanding miscibility with common water miscible organic solvents. We find that the alkyl group is most potent in determining the miscibility in these organic solvents. The initial preparation is controlled by the possibility of steric hindrance which may prevent the quaternization. The amine precursor should usually be somewhat soluble in water, and at least sufficiently so that when emulsified it will react. When the silica is dissolved in a hydroxide it is essential that the pH be high, preferably above about 11.5.

The aqueous solutions of the quaternary ammonium silicates of our invention may be concentrated to a silica concentration of 50% or more and these concentrated systems are still miscible with organic solvents especially alcohols. Certain of these aqueous systems can be concentrated to much more than 50% $SiO_2$ and can be dispersed in alcohol to produce a stable alcoholic solution.

The solvents miscible with the aqueous quaternary ammonium silicate include both polar and non-polar organic solvents, for example alcohols, especially methanol, ethanol and iso-propanol, acetone, tetrahydrofuran and dioxane. In general, the alcohols were more miscible than the other solvents. It is also possible to use mixed solvent systems especially mixed alcohols such as ethanol and methanol. These solvents are quite volatile but it is also desirable in some cases to use solvents that are not so volatile such as butanol or polyalcohols such as ethylene glycol.

Organic alkylalkanol quaternary ammonium silicates of our invention are produced from aqueous quaternary silicate solutions which are completely miscible with low molecular weight alcohols. The aqueous organic silicate is first concentrated to a high solids content by evaporation under vacuum at 45°C. or less. The resulting viscous solution is dispersed and mixed with organic solvents with vigorous agitation. It is possible to prepare alcoholic silicates by this method from aqueous alkyltriethanol quaternary ammonium silicates with mole ratios up to 35 $SiO_2/NR_4$ with the preferred range between 5 and 22.5. Using this process it is possible to produce alcoholic silicates at 20% $SiO_2$ that contain less than 10% water and preferably 3 to 5% water. If it is necessary to remove all the water possible, it can be done by several methods: (a) by distilling off an azeotrope of alcohol and water and adding more alcohol, (b) by preferential absorption using a molecular sieve of a type that will absorb water rather than alcohol such as Linde 3A or 4A or (c) by fractional distillation adding a high boiling alcohol or polyalcohol and then distilling off either the water or an azeotrope of a low molecular weight alcohol, e.g. ethanol and water.

An alternate method of preparing organic quaternary ammonium silicate is by utilizing the reaction of silicon metal and base. The appropriate organic quaternary ammonium hydroxide solution is mixed with silicon metal and just enough water to convert the silicon to silica. The water reacts with the silicon while the quaternary hydroxide acts as a catalyst producing hydrogen and silica which in turn reacts with the quaternary ammonium base to form an essentially water-free quaternary ammonium silicate solution.

PROPERTIES

It is possible to modify the organic quaternary ammonium silicates in a number of ways to produce interesting and useful nonaqueous systems. It was found that the alcoholic silicates can be acidified to pH values of about 1 to 2 without gelation, resulting in stable systems. Mixtures at a pH of about 2 are stable for about 2 months, after which time some of the mixtures gel. Mixtures at about a pH of 1 are stable for longer than 8 months. Any acid can be used to acidify the alcoholic silicates but alcohol soluble acids are preferred. Other gelling agents are compounds which hydrolyze to form an acid. The organic quaternary ammonium silicate solutions can also be modified by dissolving organic compounds that can be oxidized to form acids. Such solutions can be stable for more than 8 months. Oxidizable compounds useful for this purpose are aldehydes and polyhydroxy compounds, such as formaldehyde, acetaldehyde, paraldehyde, glycol, glycerine, polyglycols, sugars, etc.

We have found that organic quaternary ammonium silicates are compatible with organic solvents which are immiscible with the usual aqueous organic silicate solutions. For example, benzene which is incompatible with aqueous organic quaternary ammonium silicates can be added to an alcoholic silicate in excess of 100% by volume without difficulty. Both the alkaline and acidified alcoholic solutions are miscible with benzene.

Both the alkaline and the acidified organic quaternary ammonium silicate solutions may be caused to gel by neutralization. The alkaline systems may be gelled by the addition of acids or acidic salts. Acids that can be added in the form of alcoholic solutions are preferred although aqueous acids can also be used easily. The alkaline alcholic systems may also be gelled by combining them with materials that hydrolyze to acids such as anhydrides, polyaldehydes, lactones, amides, imides, etc. These gelling agents can be added as solids or as solutions in organic solvents or water. The acidified system may be gelled by the addition of organic or inorganic bases and basic salts. Gelation can also be achieved by combining the acidic and alkaline alcoholic quaternary ammonium silicate systems in the proper proportions.

The systems described above are rather sensitive and require careful attention to prepare uniform gels. However, the organic quaternary ammonium silicates modified with a dissolved, easily oxidizable organic compound provide an excellent setting system when combined with an oxidizing agent. The oxidizing agent is added to the stable organic quaternary ammonium silicate solution containing the oxidizable compound. This compound is converted by the oxidizing agent into an acid causing the pH of the mixture to drop from above 11 to the fast gelling range of about 6–8. The result is a uniform and quite strong gel with a gel time that can be varied from a few seconds to about 10 minutes. The amount of the oxidizable compound such as formaldehyde does not affect the gel time significantly as long as sufficient is present to neutralize the alkali upon oxidation. It is also possible to use an excess of the oxidizable compound. Surprisingly the amount of oxidizing agent added has an important influence on the gel time which is inversely proportional to the amount of oxidizing agent added. FIG. 1 illustrates this relationship for an alcoholic n-butyltriethanolammonium silicate at a concentration of 20% $SiO_2$ that contains 12.5 moles of $SiO_2$ per mole of cation mixed with 3 parts by weight of formaldehyde as a solution of 50% in alcohol and benzoyl peroxide added as a 10% solution in acetone as the oxidizing agent. The curve shows that quite small changes in the amount of the benzoyl peroxide added cause large changes in the gel time.

Preferably the oxidizing agent is soluble in common organic solvents. This group of oxidizing agents includes such materials as hydrogen peroxide, isobutyl peroxide, benzoyl peroxide, methyl ethyl ketone peroxide, t-butyl peroctoate (t-butyl peroxy [2-ethyl hexanoate]) and others. Although common organic solvents such as ethanol and acetone can be used to dissolve these oxidizing agents, a solvent which is difficult to oxidize such as acetone is preferred since alcohols can be oxidized to acids. In fact, by using sufficient oxidizing agent the alcohol of an alcoholic quaternary ammonium silicate can be oxidized to acetic acid causing the formation of a gel without the need for incorporation of an additional oxidizable compound into the system.

Figure 2:
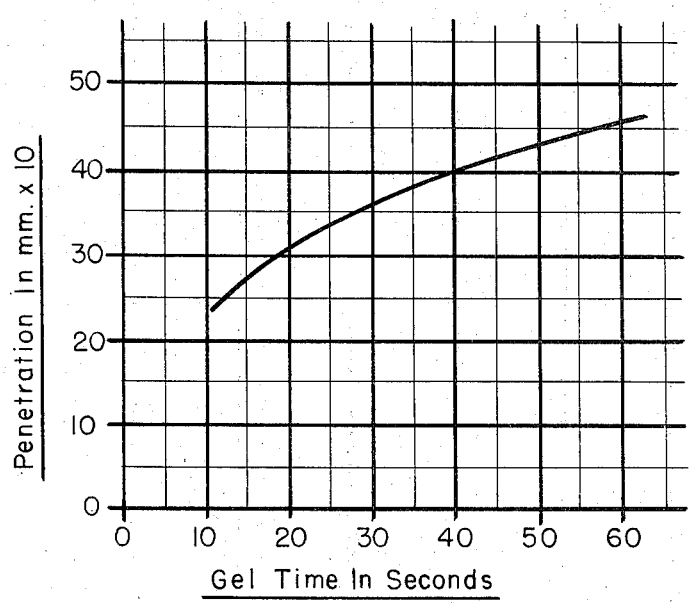

The gel strength or gel hardness is related to the gelation time. FIG. 2 shows the gel hardness measured as the penetration in millimeters 5 minutes after gelation as a function of the gelation time in seconds for the system in FIG. 1 at 20% $SiO_2$. There are other factors that also influence the gel strength or gel hardness. For about 5 minutes after gelation the gel develops strength but after that time the solvent alcohol evaporates quickly and the gel begins to crack. It also appears that silicates with low mole ratios of $SiO_2$ to cation form stronger gels than higher ratios. The strongest gels are formed with a silicate with a ratio of 5.6 moles of $SiO_2$ per mole of cation.

USE

The composition of oxidizable organic compound and organic solution of alkylalkanol ammonium silicates can be mixed with a refractory material and an oxidizing agent added to form a very stable, strong bond. This bonding system can be used for a number of applications — preparation of acid resistant cements, dental castings, foundry moldings, and back-up for investment casting. The foundry mold may be prepared by mixing an alcoholic silicate solution containing an oxidizable compound as a binder with the appropriate non-reactive particulate matter, then adding the oxidizing agent and quickly applying this mixture around the pattern. The mold sets quickly and can be stripped and the solvent ignited and burned off. The mold formed has high strength and excellent surface characteristics.

Alkaline and acidic organic solutions of alkylalkanol ammonium silicates are useful as binders in preparing both dip shells for investment casting and shell moldings which are useful in the lost wax method of casting metal. Both materials can be used in the same manner since the setting mechanism is principally the quick evaporation of the solvent. The dip slurry would be made up of an appropriate mixture of refractory materials such as silica flour, zircon, iron oxide, alumina, etc., a wetting agent and a defoamer, and enough alcoholic silicate to supply 10 to 30% $SiO_2$ in the binder. The wax pattern is then dipped into the slurry, removed and stuccoed with a fine refractory material, the coating permitted to set. This cycle is repeated several times until desired shell thickness is obtained, and then the shell for the investment casting is dried and packed with back-up material of any sort, preferably the material made with the alcoholic alkylalkanol ammonium silicate and oxidizable compound. The dip shell for the shell molding process is produced in the same way except that a sufficient number of dip coatings are put onto the pattern successively to produce a shell of sufficient strength to permit pattern burn-out and metal casting without the need for back-up. Two important advantages of our systems are that the solvent evaporates rapidly reducing the drying time and that very few adjustments must be made to the slurries to cast different metals. This is in contrast to other shell molding and investment casting binders such as ethyl silicate with which a number of changes must be made to cast metals with different casting properties.

The alkaline organic solutions of alkylalkanol ammonium silicates are also useful as vehicles for various coatings such as zinc-rich corrosion resistant and pigmented high temperature resistant paints. Zinc-rich paints may be prepared by diluting an alcoholic quaternary ammonium silicate solution to the desired concentration, such as 20 to 30% $SiO_2$ and incorporating a thickening agent to obtain a system with a useful viscosity. This vehicle is mixed with zinc dust and/or alkali-resistant pigments to produce the paint. The coatings are applied by spraying or with a brush or roller. The solvent evaporates rapidly and the coating dries more quickly than when other systems are used as the vehicle. The fast drying is one advantage of the use of the alcoholic silicate for this application but another distinct advantage is that clean-up can be accomplished with water and water soluble cleaning agents.

Glass fibers, certain synthetic organic fibers, and other fibers have very low coefficients of friction and when woven into cloth must be treated to prevent the fibers from slipping over each other. Our systems are useful for surface treatment to impart non-slip surfaces to glass, paper, and other fibers to prevent this slippage. The entirely aqueous alkylalkanol ammonium silicates diluted to about 10% $SiO_2$ are useful for this purpose but our silicates with volatile organic solvents are preferred if fast drying is needed. The fibers need only be dipped into or padded with a bath of the silicate system and then either dried at ambient conditions or at about 50°C. The small amount of residue that adheres to the fibers prevents the fibers from slipping to a great extent. A particular advantage for glass fiber treatment is the fact that alkylalkanol ammonium silicates do not weaken the fibers.

An important technical improvement in recent years has been the development of non-skid properties of packaging material surfaces, such as paper bags and cartons. This development has enabled bags to be stacked on pallets to a greater height than ever before. Our systems are quite useful for this application. The aqueous silicates can be diluted with either water or volatile solvent to produce a dilute system that can be sprayed onto the bags imparting an excellent slip resistance to the bag. These slip resistant coatings dry very quickly if the silicate is mixed with a volatile organic solvent.

A further understanding of the invention will be obtained from the following examples, which are illustrative and are not to be considered as restrictive.

EXAMPLE 1

Nalcoag 1035 silica sol (1070 parts by weight, 35% $SiO_2$) was placed in a reaction vessel equipped with a mechanical stirrer, a thermometer, a low temperature (dry-ice and acetone) reflux condenser and a gas inlet tube. Methyl amine (48 pbw of a 30% solution) was added slowly. Then ethylene oxide (61 pbw) was added to the reaction vessel slowly while the temperature of the reaction was held between 25° and 30°C. by cooling. After standing overnight the solution was concentrated to near 50% $SiO_2$ and then analyzed. The organic alkali may be determined very simply by alkali titration and the silica may be determined by first boiling the appropriate weight of the silicate with NaOH and then using the standard silica titration; a blank determination of the NaOH must also be titrated. The analysis of this material was:

| | |
|---|---|
| Methyltriethanol ammonium cation | 10.48% |
| $SiO_2$ | 47.42 |
| Total solids | 57.90 |
| Mole ratio $SiO_2$/Organic cation | 12.39 |
| Weight ratio $SiO_2$/Organic cation | 4.52 |
| pH | 11.40 |

The silicate is a slightly turbid, slightly viscous light blue solution. The silicate was diluted to 40% $SiO_2$ with water and solutions that contained the following percentages of various organic solvents could be prepared with vigorous agitation: methanol — 39.4%, ethanol — 26.3%, iso-propanol — 21.5%, acetone — 21.2%, dioxane — 21.6% and tetrahydrofuran — 18.1%. Thus the aqueous silicate with 40% $SiO_2$ accepted about 64% methanol or 35.5% ethanol. The 39.4% methanol solution contained about 24% $SiO_2$ and 31% water.

EXAMPLE 2

Nalcoag 1030 (2682 pbw) was placed in the reaction vessel of Example 1 and ethylamine (46 pbw) and ethylene oxide (145 pbw) were reacted as described in Example 1. The material was allowed to stand over-night and then concentrated to near 50% $SiO_2$. The analysis of this material was:

| | |
|---|---|
| Ethyltriethanolammonium cation | 17.24% |
| $SiO_2$ | 52.88 |
| Total solids | 70.12 |
| Mole ratio $SiO_2$/Organic cation | 8.995 |
| Wt. ratio $SiO_2$/Organic cation | 3.067 |
| pH | 11.35 |

Solutions that contained the following percentages of organic solvent could be prepared with the silicate diluted to 40% $SiO_2$: methanol — 44.2%, ethanol — 27.8%, iso-propanol — 18.3%, acetone — 18.4%, dioxane — 21.3% and tetrahydrofuran — 14.5%. Thus the aqueous solution with 40% $SiO_2$ accepted about 79% of methanol or 38.5% of ethanol. The 44.2% solution of methanol contained about 31% of $SiO_2$ and 36% of water.

EXAMPLE 3

The ethyltriethanolammonium silicate produced by Example 2 was diluted to 30% $SiO_2$ with water and then to 10% $SiO_2$ with methanol and this solution was used to impart a non-slip surface to paper. Kraft paper (38 lbs/1000 ft$^2$) was treated and found to have a coefficient of friction of 0.83 on a standard Conbar Slide tester. The untreated paper had a coefficient of 0.56.

EXAMPLE 4

Ludox HS colloidal silica at 30% $SiO_2$ (2902pbw), n-propyl amine (71 pbw) and ethylene oxide (175 pbw) were reacted as in Example 1. The analysis of the silicate concentrated to about 50% $SiO_2$ was:

| | |
|---|---|
| n-propyltriethanol ammonium cation | 15.97% |
| $SiO_2$ | 50.50 |
| Total solids | 66.47 |
| Mole ratio $SiO_2$/Organic cation | 9.984 |
| Wt. ratio $SiO_2$/Organic cation | 3.162 |
| pH | 11.33 |

Solutions that contained the following percentages of organic solvent could be prepared with the silicate diluted to 40% $SiO_2$: methanol — completely miscible, ethanol almost completely miscible, 81% iso-propanol — 41.7%, 60% acetone — 37.4%, dioxane — 37.6% and tetrahydrofuran — 26.3%. Thus the solution with 40% $SiO_2$ will accept more than 100% of ethanol or methanol, 81% of iso-propanol, and 60% of acetone or dioxane. A completely miscible solution contained about 66% alcohol, 15% $SiO_2$ and 14% $H_2O$.

EXAMPLE 5

The silicate prepared by Example 4 was further concentrated to 55% $SiO_2$ and then diluted to 30% $SiO_2$ with ethanol (83.5% miscibility). The composition of this material was:

| | |
|---|---|
| n-propyltriethanol ammonium cation | 9.48 pbw |
| $SiO_2$ | 30.00 pbw |
| Total solids | 39.49 pbw |
| Ethanol | 45.50 pbw |
| $H_2O$ | 15.00 pbw |
| Mole ratio $SiO_2$/Organic cation | 9.984 |

This alcoholic silicate was a light blue, very fluid solution which was stable for over 1 year. Up to 100% benzene or acetone could be added to this alcoholic silicate making a solution with 15% $SiO_2$ and 7.5% $H_2O$.

EXAMPLE 6

The alcoholic n-propyltriethanol ammonium silicate produced in Example 5 was used to make a zinc-rich corrosion resistant coating. A binder solution was prepared by dispersing 3 pbw of Benaqua (a hydrated magnesium silicate thickening agent) in 97 pbw alcoholic silicate with the Waring Blendor. The binder contained just less than 30% $SiO_2$ and was mixed with 250 pbw of fine zinc dust. This paint was sprayed and brushed onto said blasted steel panels. The coating dried in less than 15 minutes and could be recoated in less than 1 hour. The coatings were continuous and provided excellent protection against corrosion to the steel.

EXAMPLE 7

Ludox HS, n-butylamine and ethylene oxide were reacted to form n-butyltriethanol ammonium silicate as described in Example 1. The analysis of this material was:

| | |
|---|---|
| n-butyltriethanol ammonium cation | 18.96% |
| SiO$_2$ | 50.60 |
| Total solids | 69.56 |
| Mole ratio SiO$_2$/Organic cation | 9.190 |
| Wt. ratio | 2.669 |
| pH | 11.43 |

The silicate was a slightly turbid, slightly viscous yellow solution. It had a fairly strong odor but not at all like an amine. Solutions that contained the following percentages of organic solvents could be prepared with the silicate diluted to 40% SiO$_2$: methanol — completely miscible, ethanol — completely miscible, isopropanol — almost completely miscible, acetone — 50.8%, dioxane — 37.1% and tetrahydrofuran — 34%. The 40% SiO$_2$ solution accepted over 100% of the common water miscible alcohol, 103% of acetone and about 60% of the other common water miscible organic solvents. A solution with 75% alcohol contained 10% SiO$_2$ and 11.2% H$_2$O.

EXAMPLE 8

The n-butyltriethanol ammonium silicate prepared in Example 7 was concentrated under vacuum at 40°C. or less to 53.34% SiO$_2$ and then diluted to 20% with ethanol (U.S. Spec. SD-30) (167% miscibility). The alcoholic silicate had the following composition:

| | |
|---|---|
| n-butyltriethanol ammonium cation | 7.49 pbw |
| SiO$_2$ | 20.00 pbw |
| H$_2$O | 10.00 pbw |
| Ethanol | 62.51 pbw |
| Mole ratio SiO$_2$/Organic cation | 9.190 |

Benzene and acetone could be added to this alcoholic silicate solution up to 100% by volume before the silicate gelled or the benzene started to separate.

EXAMPLE 9

The alcoholic silicate produced in Example 8 was diluted to 10% SiO$_2$ with ethanol and used to impart non-skid properties to paper as described in Example 3. The solution was also used to impart slip resistance to fiberglas woven into a cloth. The cloth was merely dipped into the solution and allowed to dry at ambient conditions. Before the cloth had been treated the woven fibers slipped over each other and formed bunches and gathers. After treatment the fibers did not slip easily and did not form bunches and gathers.

EXAMPLE 10 n-Butyltriethanol ammonium hydroxide was mixed with Nalcoag 1035 by slowly adding the hydroxide to the silica sol under vigorous agitation. The reaction is exothermic and the reaction temperature was maintained below about 35°C. by cooling. The silicate had a mole ratio of 12.53 SiO$_2$ per mole of cation. The silicate was concentrated to 45% SiO$_2$ and then diluted to 30% SiO$_2$ with ethanol. At this concentration the water content was 7.4%; when the silicate was further diluted with ethanol to 20% SiO$_2$ the water content was about 5%.

EXAMPLE 11

Fifty parts by weight (pbw) of a 50% solution of n-butyltriethanol ammonium hydroxide that contained 10% water and 40% of ethanol was diluted to a 5% solution with 400 pbw of alcohol and 50 pbw of water. To this solution 50 pbw of silicon metal powder was added in 20 additions, about 15 minutes apart. The reaction was vigorous at first but became more sluggish at the latter stages. After the reaction was stopped, the unreacted silicon metal was filtered off and the composition of the material was:

| | |
|---|---|
| Organic cation | 4.6 pbw |
| SiO$_2$ | 9.9 pbw |
| H$_2$O | 5.2 pbw |
| Ethanol | 79.4 pbw |

The product was concentrated by distilling off the ethanol under vacuum. The composition of this material was:

| | |
|---|---|
| Organic cation | 13.8 pbw |
| SiO$_2$ | 29.7 pbw |
| H$_2$O | 15.6 pbw |
| Ethanol | 40.8 pbw |
| Mole ratio SiO$_2$/organic cation | 7.39 |

EXAMPLE 12

An n-butyltriethanol ammonium silicate of 5.69 moles of SiO$_2$ per mole of cation was prepared by the method of Example 1. This solution was concentrated in vacuo to (A) 49.90% SiO$_2$, (B) 52.52% SiO$_2$, and (C) 57.01% SiO$_2$ and then all the solutions were diluted to 20% SiO$_2$ with ethanol (149 to 185% miscibility). These alcoholic solutions had the following compositions:

| | | A | B | C |
|---|---|---|---|---|
| Cation | pbw | 12.08 | 12.08 | 12.08 |
| SiO$_2$ | do. | 20.00 | 20.00 | 20.00 |
| H$_2$O | do. | 8.00 | 6.00 | 3.00 |
| Ethanol | do. | 59.92 | 61.92 | 64.92 |
| Mole ratio | | 5.69 | 5.69 | 5.69 |

EXAMPLE 13

The silicate produced in Example 12, part (C), was further treated to remove water by adding a molecular sieve, Linde No. 4A. The resulting solution contained about 1% water and this water is part of the chemical structure of the compound.

EXAMPLE 14

The silicate produced in Example 12, part C, was further treated to remove water by adding butanol to the silicate and distilling off the alcohol and water remaining. The resulting butanolic n-butyltriethanol ammonium silicate had the following composition:

| | |
|---|---|
| Cation | 12.09 pbw |
| SiO$_2$ | 20.00 pbw |
| H$_2$O | 1.15 pbw |
| Butanol + ethanol | 66.76 pbw |
| Mole ratio | 5.69 |

EXAMPLE 15

A number of n-butyltriethanol ammonium silicates were prepared by the method of Example 1 and converted to alcoholic silicates with ethanol. The compositions of these materials were:

|  | A | B | C | D | E |
|---|---|---|---|---|---|
| Cation (pbw) | 18.3 | 12.1 | 8.3 | 5.8 | 4.6 |
| SiO$_2$ do. | 30.0 | 30.0 | 30.0 | 30.1 | 30.2 |
| H$_2$O do. | 17.0 | 14.6 | 15.0 | 15.0 | 15.0 |
| Ethanol do. | 34.0 | 43.6 | 46.9 | 49.1 | 50.2 |
| Mole ratio | 5.61 | 8.47 | 12.37 | 17.0 | 22.5 |

Isopropanol was used successfully in place of ethanol.

EXAMPLE 16

The alcoholic silicates prepared in part B and C of Example 15 were used to prepare stable acid alcoholic silicate solutions. Both materials were mixed with sufficient HCl and alcohol to reduce the pH to 2 to SiO$_2$ to 20%. These solutions were stable for about 2 months. A second set of these silicates were mixed with sufficient alcoholic HCl and alcohol to reduce the pH to 0.75 and the SiO$_2$ to 20%. These solutions were stable for more than 8 months.

EXAMPLE 17

Binder solutions for investment casting or shell molding dip slurries were prepared with an acid alcoholic silicate at 12.37 moles SiO$_2$ per mole of cation at 20% SiO$_2$ and 0.75 pH as prepared in Example 16. The composition of the dipping slurry was:

| Acid alcoholic silicate pH 0.75 | 1099 | pbw |
|---|---|---|
| Victawet 12 | 0.5 | do. |
| Octanol | 0.3 | do. |
| Silica flour (−325 mesh) | 1560 | do. |
| Silica flour (−325 mesh) | 750 | do. |

Two shells were formed with this dipping slurry with fine stuccoing material, the slurry was then diluted with about 150 pbw of the acid alcoholic silicate and another 5 dip shells were made with this slurry and stuccoed with coarse refractory material. These shells had good strengths and dimensional stability, resulting in castings of excellent surface characteristics and reproduction.

EXAMPLE 18

A binder solution similar to those used in Example 17 was made using the alkaline alcoholic silicate of Example 15, part C, instead of the acid alcoholic silicate. The unmodified silicate was diluted to 20% SiO$_2$ with ethanol for use in the binder. The shell made with this material also had good strength and dimensional stability.

EXAMPLE 19

Gels were made with the silicates prepared according to Example 15 by mixing them with glyoxal, phthalic anhydride or alcoholic HCl. The higher ratio materials required less gelling agent than the lower ratio materials but uniform gels could be formed with gel times from about 3 minutes to about one-half hour.

EXAMPLE 20

The acid alcoholic silicates at 0.75 pH prepared as described in Example 16 were gelled using sodium hydroxide, magnesium oxide, ammonium bicarbonate and ammonium acetate as the setting agents. The gel times could be varied from about 3 minutes to a practical limit of about 15 minutes. The gels were quite uniform.

Gels could also be formed by combining the acid alcoholic silicates at 0.75 pH with the alkaline alcoholic silicates prepared as described in Example 15, parts A, B and C, in the proper proportions. The gel times could be varied from about 3 minutes to about 15 minutes also.

EXAMPLE 21

The silicates prepared as described in Example 15, parts A, B and C (25 pbw) were mixed with 3 (pbw) of formaldehyde solution (50% by weight in alcohol). This solution was stable for about 5 months. To the alcoholic silicate-formaldehyde solution with a 5.6 mole ratio (moles of silica per mole of cation), 5,5, 7.0 and 9.5 (pbw) of a 10% benzoyl peroxide solution in acetone and enough acetone to make the total weight up to 37.5 pbw, were added. Gels were formed in 150, 60 and 30 seconds respectively. The gels were uniform and had quite good gel strength. To the alcoholic silicate-formaldehyde solution with an 8.47 mole ratio, 4, 5 and 6 pbw of a 10% benzoyl peroxide solution and enough acetone to make the total weight to 37.5 pbw, were added. Gels were formed in 120, 45 and 30 seconds respectively. The gels were uniform and also had good gel strength. To the alcoholic silicate-formaldehyde solution with a 12.5 mole ratio, 2.5, 3.0 and 3.5 pbw of a 10% benzoyl peroxide solution and enough acetone to make the total weight 37.5 pbw were added. The gel times were 150, 60 and 30 seconds respectively. The gels were uniform and had good gel strength.

EXAMPLE 22

The alcoholic n-propyltriethanol ammonium silicate (2.5 pbw) produced as described in Example 5 was mixed with 3g of a 60% acetaldehyde solution in alcohol. To this solution 4,5 and 6 pbw of a 10% benzoyl peroxide solution and enough acetone to make the total weight of the mixture 37.5 pbw, were added. The gel times were 200, 115 and 45 seconds respectively. The gels were uniform and had good gel strength.

EXAMPLE 23

The alcoholic silicate-formaldehyde solution of Example 21 that contained 12.5 moles of SiO$_2$ per mole of silicate was used to bond refractories of the type that would be used to form foundry casting molds. 60 pbw of the silicate-formaldehyde solution were mixed with 170 pbw of the refractory material and 13.1 pbw of acetone were mixed with 7.6 pbw of 10% benzoyl peroxide and then combined with the slurry of binder and refractory. The thin slurry was poured into a mold and set in 45 sec. The mold could be handled at once and when ignited the alcohol burned vigorously for 20 to 30 minutes. The surface after burning was satisfactory for foundry casting.

EXAMPLE 24

Ludox HS, iso-butylamine and ethylene oxide were reacted to form a silicate with a ratio of 9.29 moles of SiO$_2$ per mole of iso-butyltriethanol ammonium cation as described in Example 1. Solutions could be prepared with this silicate diluted to 40% SiO$_2$ that contained the following amounts of organic solvents: 119% methanol — 54.4%, 83.2% ethanol — 45.3%, iso-propanol — 24.8%, acetone — 23.2%, dioxane — 21.5% and tetrahydrofuran — 22.7%.

EXAMPLE 25

Ludox HS, allylamine and ethylene oxide were reacted to form a silicate with a ratio 9.95 moles of $SiO_2$ per mole of allytriethanol ammonium cation as described in Example 1. The silicate at a concentration of 40% silica was completely miscible with methanol and ethanol.

EXAMPLE 26

Polyethoxydiethylethanol ammonium silicate was prepared from Nalcoag 1035, ethylene oxide and diethylaminoethoxyethanol as described in Example 1. This silicate at a concentration of 40% $SiO_2$ was completely miscible with methanol and ethanol and solutions could be made that contained the following amounts of organic solvents: iso-propanol — 32.2%, acetone 24.5%, dioxane 32.8%, and tetrahydrofuran 42.1%.

EXAMPLE 27

The silicate prepared in Example 26 was concentrated to 56.80% $SiO_2$ by evaporation under reduced pressure. The silicate was diluted with 89% ethylene glycol to 30% $SiO_2$. At this concentration the silicate contained 10% $H_2O$.

EXAMPLE 28

A settable sol of silica in alcohol may be formed by the catalytic reaction of alkali metal oxide on silicon alloy dispersed in alcohol at or near the boiling point of the alcohol. $Na_2O$ and $K_2O$ are preferred as catalysts.

In one example 2 pbw of $K_2O$ as alcoholic potash was dissolved in 100 grams of ethanol and fine ferrosilicon or silicon metal having above about 95%, preferably 98%, of silicon was dispersed in the solution of the temperature raised to about 70°C. The first increment of silicon was about 5 grams and whenever the reaction slowed down another gram of silicon powder was added to the solution boiling under reflux. This was continued until 15 grams of silicon powder had been added. After the reaction appeared to be complete, the solution was cooled and filtered and the ethanolic silicon sol contained about 10% $SiO_2$ at a pH of about 11.5. The sol could be concentrated to about 20% or more of $SiO_2$.

Thus we have found alkylalkanol quaternary ammonium silicates which are characterized by a relatively high miscibility with organic solvents including alcohols, acetone and tetrahydrofuran. With methanol the miscibility is 80% or more. These solvent solutions contain at least about 15% $SiO_2$ and less than about 10% water. The specific quaternary ammonium silicates are those with alkylalkanol groups including saturated and unsaturated alkylalkanol such as n-propyl, n-butyl, allyl, polyethoxy diethanol, and alkyl triethanol. These quaternary ammonium silicates also have a mole ratio of silica to organic cation of up to about 35 and preferably from about 5 to about 22.5. We have found these quaternary ammonium silicates of our invention are especially useful as rapidly setting solutions or vehicles for coatings and refractory molds, and such like, and that the solutions remain stable in the presence of non-reactive additives whether solid or soluble such as oxidizable substances which react with oxygen to form acids and that indeed if the pH is reduced rapidly to 2 or below, these acidic solutions are also quite stable.

More or less detailed claims will be presented hereinafter and even though such claims are rather specific in nature those skilled in the art to which this invention pertains will recognize that there are obvious equivalents for the specific materials recited therein. Some of these equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What we claim is:

1. A stable solution consisting essentially of an alkylalkanol quaternary ammonium silicate, water in an amount less than 10% by weight of the solution, and the balance, a water miscible organic solvent selected from the group consisting of methanol, ethanol, isopropanol, acetone, tetrahydrofuran, dioxane, butanol, and ethylene glycol, said alkylalkanol groups being selected from the group consisting of alkyl groups having one to four carbon atoms and ethanol and wherein the silica content of the solids placed in solution is at least 15% on a weight basis.

2. The organic alkylalkanol quaternary ammonium silicate solution of claim 1 in which the alkyl group contains from three to four carbon atoms.

3. The organic alkylalkanol quaternary ammonium silicate solution of claim 1 in which the alkyl group is unsaturated.

4. The organic alkylalkanol quaternary ammonium silicate solution of claim 1 in which the alkyl group is selected from the group consisting of n-propyl, n-butyl and allyl.

5. The organic alkylalkanol quaternary ammonium silicate solution of claim 1 in which the alkylalkanol is a polyethoxy diethylethanol.

6. The organic alkylalkanol quaternary ammonium silicate solution of claim 1 in which the mole ratio of silica to organic cation is up to about 35.

7. The organic alkylalkanol quaternary ammonium silicate solution of claim 1 in which the mole ratio of silica to organic cation is from about 5 to about 22.5.

8. The organic alkylalkanol quaternary ammonium silicate solution of claim 1 in which the organic solvent is selected one from the group consisting of methanol, ethanol, propanol, isopropanol and butanol.

9. The method of preparing the organic alkylalkanol quaternary ammonium silicates solutions of claim 1 comprising:

a. reacting an alkylene oxide, an amine, and a silica sol at temperatures below about 35°C;

b. concentrating silicate solution at temperatures below about 50°C.; and c. adding the water miscible organic solvents in such excess that the water content of the product is below 10% and the silica content is at least about 15%.

10. A stable acidic alcoholic alkylalkanol quaternary ammonium silicate solution formed by reducing the pH of the product of claim 1 to 2 or below.

11. The method for forming a gel and binder system in which the stable acidic alcoholic alkylalkanol quaternary ammonium silicate of claim 10 is caused to react with an alkaline compound.

* * * * *